United States Patent
Pollini et al.

(10) Patent No.: US 7,920,867 B2
(45) Date of Patent: Apr. 5, 2011

(54) MODIFIED OVERHEAD ADJUSTMENT FUNCTION

(75) Inventors: Gregory P. Pollini, Freehold, NJ (US);
Vikram Kaul, Ocean, NJ (US);
Stephanie Demers, Westfield, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1259 days.

(21) Appl. No.: 11/342,100

(22) Filed: Jan. 27, 2006

(65) Prior Publication Data
US 2006/0234714 A1    Oct. 19, 2006

Related U.S. Application Data

(60) Provisional application No. 60/647,921, filed on Jan. 28, 2005.

(51) Int. Cl.
H04W 36/00 (2009.01)
H04W 72/00 (2009.01)
H04W 40/00 (2009.01)
H04W 4/00 (2009.01)

(52) U.S. Cl. ........ 455/436; 455/442; 455/446; 455/453; 370/331

(58) Field of Classification Search .................. 455/436, 455/446, 453; 370/331
See application file for complete search history.

(56) References Cited

U.S. PATENT DOCUMENTS

| 5,465,390 A * | 11/1995 | Cohen .......................... 455/446 |
| 6,690,939 B1 * | 2/2004 | Jonsson et al. ................. 455/453 |
| 2003/0186693 A1 * | 10/2003 | Shafran et al. ................. 455/423 |

* cited by examiner

Primary Examiner — Dwayne D Bost
Assistant Examiner — Michael Mapa
(74) Attorney, Agent, or Firm — Philip J. Feig (57) ABSTRACT

A MOAF algorithm is used to resize cells for balancing capacity. The MOAF algorithm bases its decision on a cell and all other cells which the algorithm decides are sufficiently close in a propagation sense to affect the results. The MOAF algorithm also automatically determines those cells in an area which are most heavily loaded and those cells which are lightly loaded. The MOAF algorithm will only decrease the size of a cell if it determines specific adjacent cells that are willing and able to accept the load, and the MOAF algorithm will increase the size of a cell only if there is a nearby heavily loaded cell that requires the removal of load. Moreover, the MOAF algorithm can be tuned (via the threshold parameter T) to shift the focus of the optimization from avoidance of coverage holes to the avoidance of creation of excessive handover legs. Because the changes are electrical rather than physical they can be deployed instantaneously via the network management system thus saving the cost of sending a field crew to the site. Moreover, it is possible to make these changes much more frequently than has been possible in the past thereby permitting the optimization of the network to be done in near real time to meet the temporal changes in the geographic distribution of customers.

2 Claims, 4 Drawing Sheets

|  | 0.48 | 0.32 | 0.20 |  |
|---|---|---|---|---|
| 0.33 |  | 0.50 | 0.17 |  |
| 0.20 | 0.40 |  |  | 0.40 |
| 0.10 | 0.30 |  |  | 0.60 |
|  |  | 0.50 | 0.50 |  |

FIGURE 3

|     | 0.2  | 0.8  | 0.5  | 0.3  | 0.4  |
|-----|------|------|------|------|------|
| 0.2 |      | 0.48 | 0.32 | 0.20 |      |
| 0.8 | 0.33 |      | 0.50 | 0.17 |      |
| 0.5 | 0.20 | 0.40 |      |      | 0.40 |
| 0.3 | 0.10 | 0.30 |      |      | 0.60 |
| 0.4 |      |      | 0.50 | 0.50 |      |

FIGURE 4

|     | 0.2  | 0.8  | 0.5  | 0.3  | 0.4  |
|-----|------|------|------|------|------|
| 0.2 |      | 0.48 | 0.32 | 0.20 |      |
| 0.8 | 0.33 |      | 0.50 | 0.17 |      |
| 0.5 | 0.20 | 0.40 |      |      | 0.40 |
| 0.3 | 0.10 | 0.30 |      |      | 0.60 |
| 0.4 |      |      | 0.50 | 0.50 |      |

FIGURE 5

|       | 0.2  |   | 0.5  | 0.3  | 0.4  |
|-------|------|---|------|------|------|
|       |      |   |      |      |      |
| 0.8   | 0.33 |   | 0.50 |      |      |
| 0.5   | 0.20 |   |      |      | 0.40 |
|       |      |   |      |      |      |
| 0.4   |      |   | 0.50 | 0.50 |      |

FIGURE 6

|       | 0.2  |   | 0.5  |   |   |
|-------|------|---|------|---|---|
|       |      |   |      |   |   |
| 0.8   | 0.33 |   | 0.50 |   |   |
| 0.5   | 0.20 |   |      |   |   |
|       |      |   |      |   |   |
|       |      |   |      |   |   |

FIGURE 7

MODIFIED OVERHEAD ADJUSTMENT FUNCTION

CROSS-REFERENCE TO RELATED APPLICATIONS

This application claims the benefit of the filing date of U.S. Provisional Patent Application No. 60/647,921, filed Jan. 28, 2005, the disclosure of which is hereby incorporated herein by reference.

FIELD OF THE INVENTION

The present invention relates to optimizing cell site capacity using electrical modifications and specifically to an algorithm and system for load adjustment via overhead power modification of cells in a cellular system.

BACKGROUND OF THE INVENTION

Since the early days of cellular telephony one of the key aspects of system design has been to provide signal to locations where the customers are located and to prevent the signal from propagating further than necessary, thereby causing interference to others and reducing the overall system capacity and performance.

Working within the constraint posed by a fixed cell site location, by the 1980's there were four accepted techniques that could be used to affect the coverage of a cell. These were needed to insure that the cell provided coverage in the areas where customers are located and did not provide excessive interference in other areas. Three of the four techniques were based on deployment of the antenna at the cell site. The antenna height on the tower could be changed, the antenna azimuth could be changed, or the downtilt of the antenna could be changed. The fourth technique involved the modification of the transmit power on the broadcast system information and/or paging channels. This later technique was not widely used in practice except for limited special cases. In the late 1980's when the GSM digital cellular system was being developed, a fifth technique became available, the modification of various system parameters which control mobile station operation. For example, it was suggested in the GSM Phase I recommendations that the handover thresholds could be used to adaptively control cell sizes to meet the needs of spatially varying traffic loading over time. The first three techniques described above are commonly referred to as physical techniques while the latter two are commonly referred to as electrical techniques.

The actual decision to adjust a cell using one of the 5 techniques cited above has typically relied on both the good intuition of the RF planner as well as extensive analysis done via an RF planning tool. Thus it is generally accepted that significant effort, and therefore cost, is required to plan these changes and even more to deploy them as traditional cellular providers have focused primarily on the physical techniques which require sending a service crew to the cell site to make modifications to the antennas. Less attention has been paid to the electrical techniques as they are as not as well understood within the industry. With the introduction of CDMA technology in the 1990's this became even more the case as the CDMA system has many more parameters that can be adjusted and they are intimately related to each other in complex ways. This has motivated cellular providers to adhere to the manufacture default settings and to continue to focus exclusively on the well understood physical modifications. Indeed, a market for consulting services in the area of cell site adjustments for capacity planning has arisen as service providers do not have the staff and time to affect the needed physical adjustments.

The function of the Telcordia Auto RF product is to perform the cell site capacity optimizations using the electrical techniques rather than the physical techniques. Electrical modifications can be implemented more rapidly and at significantly reduced costs. Therefore, significant benefits can be seen by service providers. While the analysis techniques, methods, and procedures to support physical changes are well understood within the industry and have been incorporated into many RF planning tools, the methodology to support electrical changes based on actual network traffic measurements is not available in the public domain, nor are they presently supported within the RF planning tool industry.

SUMMARY OF THE INVENTION

It is a primary object of the present invention to provide an algorithm to resize cells for capacity optimization using the fourth technique described above. In the context of a CDMA system, this means that the power allocated to the overhead channels is changed to appropriately alter the coverage area of certain cells. These techniques are equally applicable to different types of CDMA technologies including the IS-95 family of standards, the IS-2000 family of standards, and the ETSI UTRA European WCDMA standards. The algorithm provides a means to optimize capacity and at the same time reduce the occurrence of undesirable events such as call drops and call setup failures.

The algorithm of the present invention allows for a rapid calculation of the needed changes in the overhead channels. Because the changes are electrical rather than physical, they can be deployed instantaneously via the network management system thus saving the cost of sending a field crew to the site. Moreover, it is possible to make these changes much more frequently than has been possible in the past thereby permitting the optimization of the network to be done in near real time to meet the temporal changes in the geographic distribution of customers.

The concept of using overhead power adjustments to resize cells in a cellular system has been known in the industry since at least the mid 1980's. Due to the perceived complexity of using this technique relative to the better understood physical changes, little has been done to develop tools and techniques to implement the electrical changes. The Dynamic Overhead Power Optimization (DOPO)" was created for the Auto RF tool. The Dynamic Overhead Power Optimization method and system are described in U.S. Patent Application Publication No. 2005/0176419.

As used herein, the term sector refers to a piece of wireless telephony equipment which transmits its signal over a limited geographic area. In a cellular system, complete coverage of a region to be served is accomplished by the use of many such sectors. The term sector is sometimes used interchangeably with the term cell.

The DOPO algorithm determines which sectors are candidates to be increased or decreased. as follows:
1.—For each sector i in the system set the indicator flags flag_dec(i)=0 and flag_inc(i)=0.
2.—For each sector i for which overhead adjustments are allowed to be made, determine if the load at that sector load(i) exceeds the decrement threshold t_dec. If load(i)>t_dec mark this sector as a candidate for overhead power reduction by setting flag_dec(i)=1.
3.—For each sector i for which overhead adjustments are allowed to be made, determine if the load at that sector load(i) equals or falls below the increment threshold t_inc. If load(i)≦t_inc mark this sector as a candidate for overhead power increase by setting flag_inc(i)=1.

Perform the overhead modification as follows:
1.—For those sectors i for which flag_dec(i)=1, decrease the overhead power by delta_OH.
2.—For those sectors i for which flag_inc(i)=1, increase the overhead power by delta_OH.
3.—Constrain the overhead on each sector i to be between a maximum value of f_max(i) and a minimum value of f_min(i).

Known strengths of the DOPO algorithm include:

Simplicity: Changes to the overhead at a particular sector are based solely on the loading conditions that exist at that sector relative to the t_dec and t_inc thresholds.

Ease of Testability: Correct operation of the algorithm can be verified for iteration k of the overhead adjustment procedure by inspection of the load values at each of the i sectors, load(i), and the fractional power allocation to overheads at each of the sectors prior to this iteration. On a sector-by-sector basis verify that the overhead is changed according to the rules provided above.

Known weaknesses of the DOPO algorithm include:

The lightly loaded adjacent to lightly loaded case. When this happens the two cells increase their overhead power allocation until they reach the maximum allowed value. This results in increased pilot pollution without any load being offloaded from highly loaded cells. This is an inherent limitation of the DOPO algorithm as it bases its decision to increase or decrease the overhead solely on the loading conditions at a sector independent of all other sectors in the system.

The heavily loaded adjacent to heavily loaded case. When this happens the two cells decrease their overhead until the load at each drops below the threshold t_dec or the minimum overhead fraction, f_min(i) for sector i is reached. Load is reduced by creating a coverage hole into which users are lost. This is an inherent limitation of the DOPO algorithm as it bases its decision to increase or decrease the overhead solely on the loading conditions at a sector independent of all other sectors in the system.

High sensitivity to the "correct" choice of t_dec and t_inc: Three undesirable cases can occur as follows:
1.—The load of each sector i satisfies t_inc<load(i)≦t_dec for t_inc<t_dec or t_dec<load(i)≦t_inc for t_dec≦t_inc. In this case the optimization will run to conclusion without changing any of the overhead power settings.
2.—The load at each sector i satisfies load(i)≦t_dec for t_inc<t_dec with load(j)≦t_inc for some sectors j, or load(i)≦t_inc for t_dec≦t_inc with load(j)≦t_dec for some sectors j. In this case a number of sectors will grow and no sectors will shrink. Thus no highly loaded sectors will attempt to offload users, and the level of pilot pollution will increase. In addition, the mean number of users in soft handover will increase and this may reduce call drops and call set up failures.
3.—The load of each sector i satisfies t_inc<load(i) for t_inc<t_dec with load(j)>t_dec for some sectors j, or t_dec<load(i) for t_dec≦t_inc with load(j)>t_inc for some sectors j. In this case a number of sectors will shrink and no sectors will grow. Thus some highly loaded sectors will shrink, but no adjacent lightly loaded sectors will grow to take the load. A small amount of change like this may be good if the soft handover region is too large, but eventually coverage holes tend to form.

For the reasons enumerated above, careful analysis of each area is required to choose values for t_dec and t_inc. This analysis requires running a study to determine the simulated values of loading, determining which sectors are problem sectors, setting the t_dec to a small enough value that includes those problem sectors, while setting t_inc to a large enough value to include all adjacent lightly loaded sectors.

Thus there were two objectives that motivated the development of the Modified Overhead Adjustment Function (MOAF) algorithm:
1.—Solve the lightly loaded and heavily loaded sector adjacency problem of the DOPO algorithm that required off line processing during trials to appropriately choose cells to freeze and unfreeze.
2.—Provide a mechanism to automate or eliminate the selection of the t_inc and t_dec thresholds on a run-by-run basis.

While for the DOPO algorithm all sectors i whose load(i) exceeds max(t_inc, t_dec) are decreased in size as long as f_OH(i)>f_min(i), where f_OH(i) is the fraction overhead power allocation at sector i and f_min(i) is the minimum allowed fractional allocation, and all sectors j whose load load(j) meets or falls below min(t_inc, t_dec) are increased in size as long as f_OH(j)<f_max(j), where f_OH(j) is the fraction overhead power allocation at sector j and f_max(j) is the maximum allowed fractional allocation, the MOAF algorithm will not decrease the size of a sector i unless it also grows one or more sectors j to accept the load shed from sector i. The ability of a sector j to accept load from a sector i is measured by the probability of a soft handover pair between sectors i and j being in excess of a threshold T. In addition, rather than relying upon fixed loading thresholds t_dec and t_inc, the MOAF algorithm uses a relative measure of loading derated by a hysteresis margin to account for simulation noise so that the load of a sector j that is a candidate to accept load from a sector i must satisfy load(j)<load(i)−h where h is the hysteresis. The thresholds t_inc and t_dec are used only to avoid pathological situations. To prevent a heavily loaded sector at a load of α from growing set the t_inc parameter to α. It is necessary to set t_inc≦1−γ where γ is the achieved precision of the loading statistic. To prevent a lightly loaded sector at a load of β from shrinking set the t_dec parameter to β.

Further objects of the present invention will become more clearly apparent when the following description is read in conjunction with the accompanying drawings.

DETAILED DESCRIPTION

The method comprising the algorithm for practicing the present invention is sometimes hereafter called the "Modified Overhead Adjustment Function (MOAF)" and is compared to the existing DOPO method. MOAF is illustrated via an example instantiation within the Matlab programming language.

Figure 1:
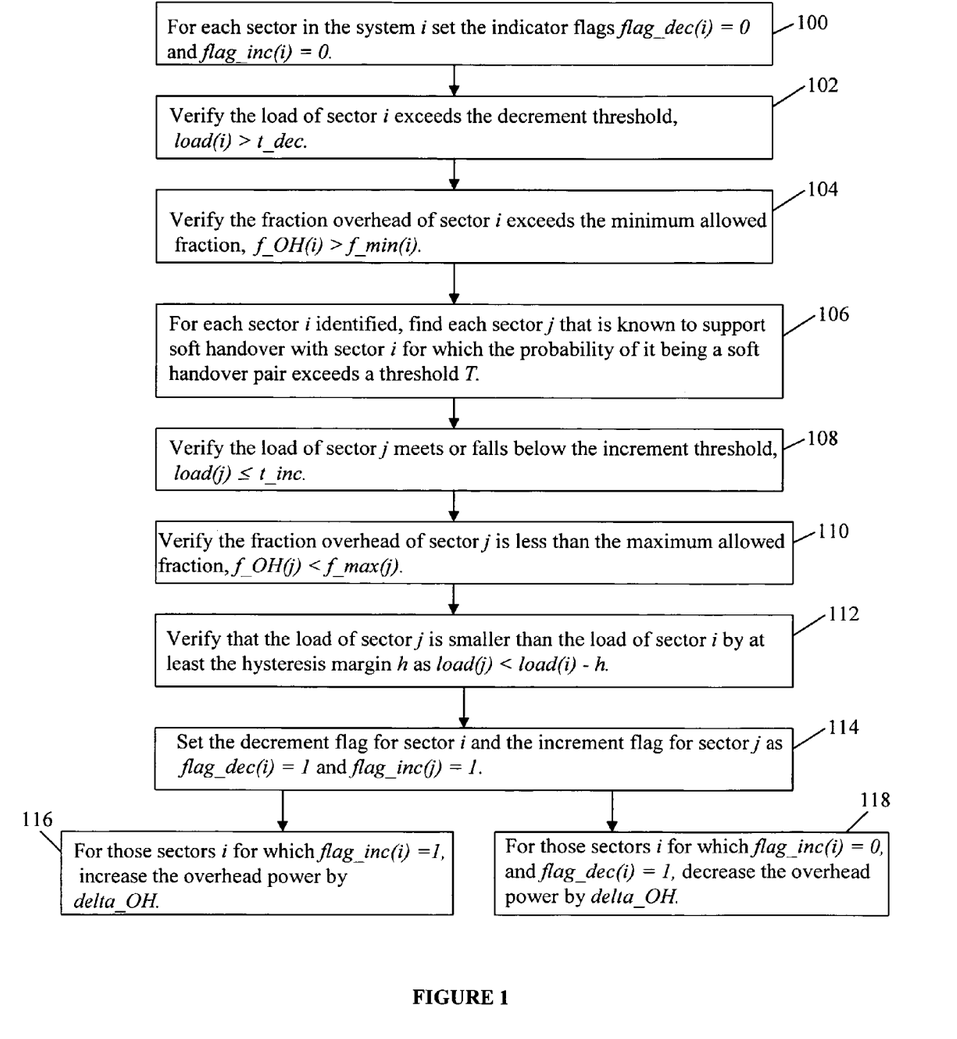
FIG. 1 is a flow diagram of the MOAF optimization algorithm.

Referring now to FIG. 1, there is shown a flow diagram of a MOAF algorithm. MOAF determines which sectors are candidates to be increased or decreased as follows:

1.—For each sector i in the system set the indicator flags flag_dec(i)=0 and flag_inc(i)=0 in step 100.

2.—For each sector i in which a change of overhead is allowed, that passes all tests in the sub clauses below, proceed to step 3:

2A.—Verify the load of sector i exceeds the decrement threshold, load(i)>t_dec in step 102.

2B.—Verify the fraction overhead of sector i exceeds the minimum allowed fraction, f_OH(i)>f_min(i) in step 104.

3.—For each sector i identified in step 2, find each sector j that is known to support soft handover with sector i for which the probability of it being a soft handover pair exceeds a threshold T in step 106. For each sector j for which this is true and for whom the tests in the sub clauses below are satisfied, proceed to step 4.

3A.—Verify the load of sector j meets or falls below the increment threshold, load(j)≦t_inc in step 108.

3B.—Verify the fraction overhead of sector j is less than the maximum allowed fraction, f_OH(i)<f_max(i) in step 110.

3C.—Verify that the load of sector j is smaller than the load of sector i by at least the hysteresis margin h as load(j)<load(i)−h in step 112.

4.—Set the decrement flag for sector i and the increment flag for sector j as flag_dec(i)=1 and flag_inc(j)=1 in step 114.

Handle conflicts in which both flag_dec and flag_inc are set to one and perform the overhead modifications as follows:

1.—For those sectors i for which flag_inc(i)=1, increase the overhead power by delta_OH in step 116.

2.—For those sectors i for which flag_inc(i)=0, and flag_dec(i)=1, decrease the overhead power by delta_OH in step 118.

Known strengths of the MOAF algorithm versus the existing DOPO algorithm:

1.—MOAF solves the known weaknesses of the DOPO algorithm enumerated above with only a minor increase in code complexity and a negligible increase in run time performance.

2.—Product test has shown that the MOAF algorithm is able to find a superior solution than the DOPO algorithm.

Known weaknesses of the MOAF algorithm versus DOPO:

1.—Algorithm is more difficult to test.

2.—Parametric inputs to the algorithm are more difficult to understand and explain.

The key differentiators of the MOAF algorithm relative to the existing DOPO algorithm are now described.

1.—While the DOPO algorithm acts on each cell independently, the MOAF algorithm bases its decision on a cell and all other cells which the algorithm decides are sufficiently close in a propagation sense to affect the results.

2.—While the DOPO algorithm requires a user supplied definition of heavily loaded and lightly loaded that must be tailored to each specific area in which the algorithm is used, the MOAF algorithm automatically determines those cells in an area which are most heavily loaded and those cells which are lightly loaded.

3.—The MOAF algorithm has been shown to achieve the desired performance improvements with fewer changes to network settings than were previously required by the DOPO algorithm. This is because the MOAF algorithm will only decrease the size of a cell if it determines specific adjacent cells that are willing and able to accept the load, and the MOAF algorithm will increase the size of a cell only if there is a nearby heavily loaded cell that requires the removal of load.

4.—Unlike the DOPO algorithm, the MOAF algorithm can be tuned (via the threshold parameter T) to shift the focus of the optimization from avoidance of coverage holes to the avoidance of creation of excessive handover legs.

Below is a sample instantiation of the MOAF algorithm implemented in the Matlab programming language.

Begin Algorithm Code.

```
% GPP convoluted algorithm
% Figure out who to adjust
for i=1:numOpt
    ii = find(sectlist==opt_list(i));
    if ( (max_loading(ii) > dec_load_trigger) && (betavec(ii) >
    beta_min(i)) )
        for j=1:numOpt
            jj = find(sectlist==opt_list(j));
            if (indhopair(ii,jj) > 0)
                if ( (max_loading(jj) <= inc_load_trigger) && ...
                    (max_loading(jj) < max_loading(ii) −
                    hysteresis_margin)
                    && ...
                    (betavec(jj) < beta_max(j)) )
                    flag_inc(jj) = 1;
                    flag_dec(ii) = 1;
                end % found someone to accept load, a sink
            end % found a handover pair
        end % loop over candidate handover pairs
    end % found someone that wants to shed load, a source
end % loop over all sectors in optlist
% Make overhead adjustments
% Print some status stuff as we go
for i=1:numOpt
    ii = find(sectlist==opt_list(i));
    if (flag_inc(ii) == 1)
        betavec(ii) = betavec(ii) + del_beta;
        betavec(ii) = min(betavec(ii), beta_max(i));
        inc_num = inc_num + 1;
        fprintf('Power Allocation is increased for sector %3i\n',sectlist(ii));
    elseif (flag_dec(ii) == 1)
        betavec(ii) = betavec(ii) − del_beta;
        betavec(ii) = max(betavec(ii), beta_min(i));
        fprintf('Power Allocation is decreased for sector %3i\n',sectlist(ii));
        dec_num = dec_num + 1;
    end
end
```

End Algorithm Code.

Figure 2:
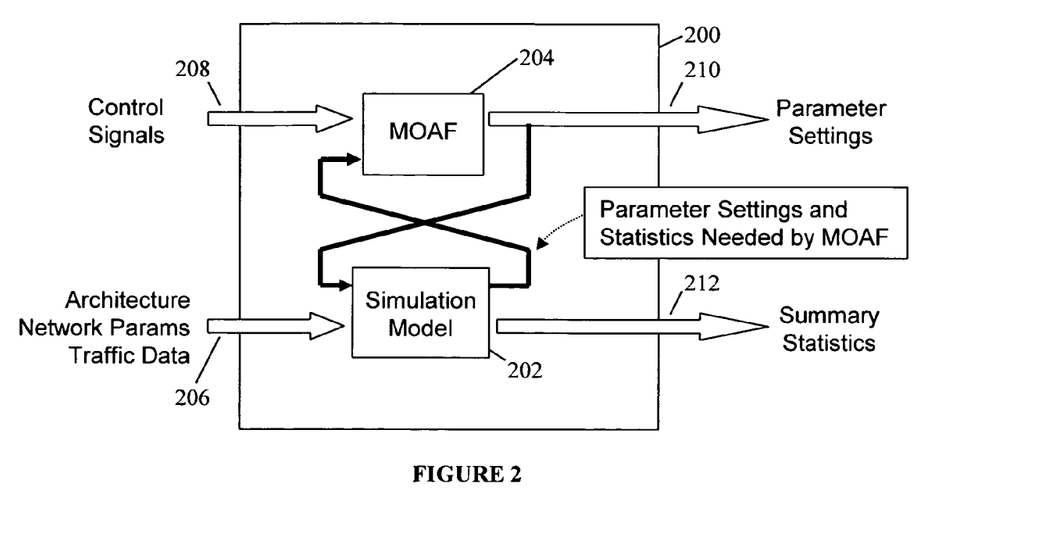
FIG. 2 is a schematic diagram of a system architecture showing the role of the MOAF optimization algorithm.

FIG. 2 shows an overall system architecture for use of the MOAF optimizer. Inputs are shown entering the left side of each element, and outputs exit from the right side of each element. The overall system is shown to contain the MOAF algorithm as well as a simulation model. The MOAF optimizer is a machine capable of executing the MOAF algorithm. Many different simulation models can be considered for use with MOAF as long as they produce the set of statistical inputs required by MOAF.

The overall system is shown in box 200. The objective of the system is to create a simulation model 202 that represents the actual network, and to use the simulation model to test various proposed network changes suggested by MOAF 204. Inputs are of two types, those needed to support the simulation model 206, and those additional parameters 208 needed for the MOAF optimizer. A comprehensive simulation will, in general, require a detailed description of the network architecture, lists of network parameters associated with each element in the architecture, and measurements of the traffic loading upon the network. The network parameters include the overhead channel settings currently in the network; these will be changed by the MOAF optimizer. Additional inputs to MOAF include the handover threshold, hysteresis margin, and increment and decrement thresholds as described above. Outputs are of two types. First, the list of network settings 210 developed by the MOAF optimizer will be subsequently deployed in the network. Second, two sets of summary statistics 212 will be provided. These statistics will characterize the network prior to making changes, and will summarize the expected changes that will occur in the network post deployment.

The MOAF optimizer and simulation model are run repeatedly in a loop. Each run of MOAF creates a new choice of parameter settings. These settings are fed to the simulation model. The simulation model assesses the detailed network response to these settings. As well as providing summary statistics for the RF engineer, a number of specific results are prepared for MOAF to use in the next iteration. The set of statistics desired by MOAF and the parameter settings used for the simulation evaluation are passed to MOAF and the iteration continues. Convergence is deemed to be reached when either the MOAF is no longer able to make additional changes, or the maximum number of iterations is reached.

The statistics provided for MOAF comprise two data types. The first type is the scaled power loading and the second type is the handover pair matrix. These are described below.

The power loading information element is a list which contains an entry for each sector in the system. The power loading information is a number between 0 and 1. It is constructed as follows: For each carrier at a given sector, the simulation model produces the average power transmitted by the base and the percentage of users that are blocked due to either per-user power limits or total amplifier limits. The power is normalized to be a number between 0 and 1 by dividing it by the total available amplifier power. Denote this as the fractional power load. The blocking percentage is divided by 100 to get the blocking fraction. The scaled load at the particular carrier is defined to be the quotient of the fractional power load and one minus the blocking fraction. If this number exceeds one it is truncated to one. The scaled power values for each carrier are compared and the largest value is saved and passed as the scaled power loading input per sector to MOAF.

A handover pair matrix information element is a table whose number of rows and number of columns both equal the number of sectors. The handover matrix is interpreted as follows: Consider a user being served by sector i. When such a user is in soft handover, to find the sectors that are likely to be in soft handover with sector i, inspect the ith row of the table. Identify the columns which have non-zero entries in the ith row. These are the sectors which a user in sector i are likely to be in soft handover with. The numbers contained within the table are the probability of the event.

Figure 3:
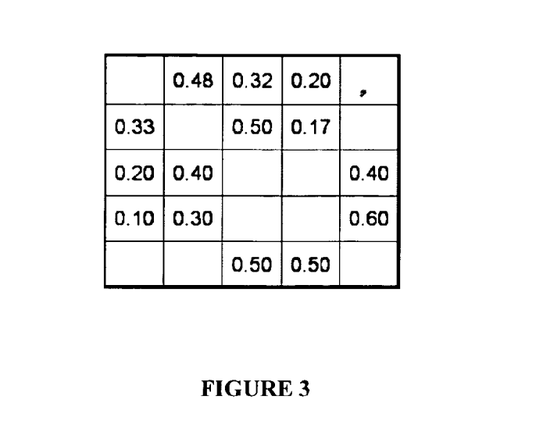
FIG. 3 shows a sample handover matrix for a cellular system having 5 sectors.

A sample of a handover pair matrix for a system with only 5 sectors is shown in FIG. 3 having 5 rows and 5 columns. Consider sector 2. A user served by sector 2 that is in soft handover will be in soft handover with sector 1 with probability 0.33; it will be in soft handover with sector 3 with probability 0.50; and it will be in soft handover with sector 4 with probability 0.17.

An example of the operation of the MOAF algorithm is now provided.

Assume that the handover threshold is set to 0.18, the hysteresis margin is set to 0.2, the decrement threshold is set to 0.3, and the increment threshold is set to 0.7. These are not necessarily good choices for a real system but are chosen to illustrate the various complexities of the MOAF algorithm with a single simple example.

Figure 4:
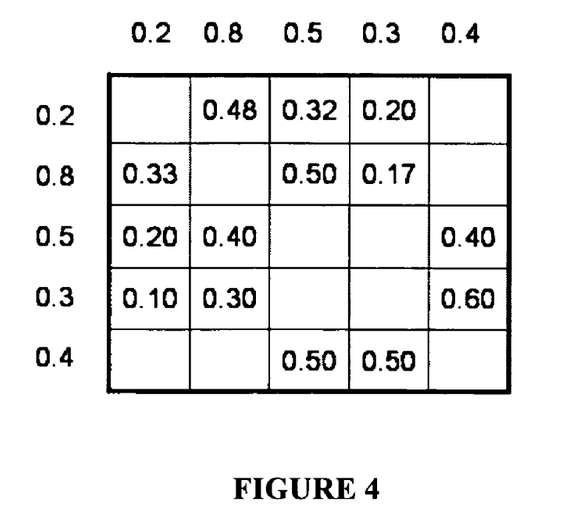
FIG. 4 shows the sample handover matrix of FIG. 3 with assumed loads marked along the column and row headers.

Assume that the scaled loads at the 5 sectors in the system represented by the handover matrix of FIG. 3 are given as 0.2, 0.8, 0.5, 0.3, and 0.4. FIG. 4 shows the matrix of FIG. 3 with the columns and rows labeled with these assumed loads.

The MOAF algorithm is now applied on the data in matrix FIG. 4 in steps. Values are marked if they are less than or equal to the handover threshold. Row labels are marked if they are less than or equal to the load decrement threshold. Column labels are marked if they are greater than the load increment threshold. The marked values, rows and columns are removed as described below.

Figure 5:
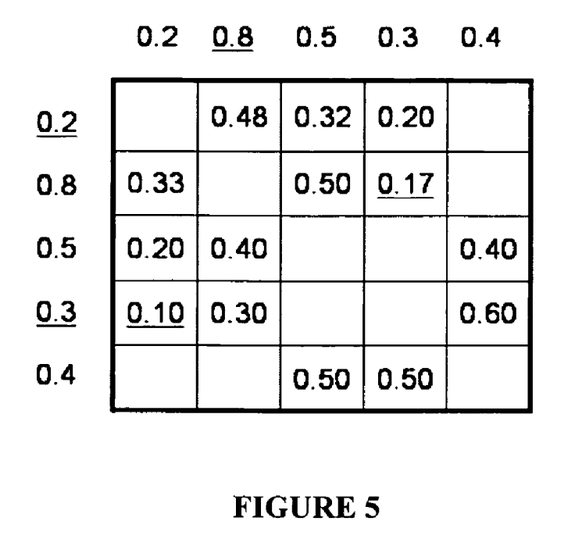
FIG. 5 shows the sample handover matrix of FIG. 4 with select values, row labels, and column labels underlined as being marked for removal.

First, consider the handover threshold. The handover threshold is set to 0.18 in accordance with the earlier assumption. Only table entries whose value exceeds 0.18 should be allowed; all values less than or equal to 0.18 should be marked for removal. FIG. 5 shows the values 0.17 in the second row and 0.10 in the fourth row as being underlined as values to be removed.

Second, consider the load decrement threshold. The load decrement threshold is set to 0.3 in accordance with the earlier assumption. Only rows whose label exceeds 0.3 should be allowed; all rows less than or equal to 0.3 should be marked for removal of entries. FIG. 5 shows the first and fourth rows with underlined labels as they are both less than or equal to 0.3. The values in the first and fourth rows should be removed.

Third, consider the load increment threshold. The load increment threshold is set to 0.7 in accordance with the earlier assumption. Only columns whose label is less than or equal to 0.7 should be allowed; all columns whose labels are greater than 0.7 should be marked for removal. FIG. 5 shows that the label of column 2 is underlined as its values exceeds 0.7. All values in that column should be removed.

Figure 6:
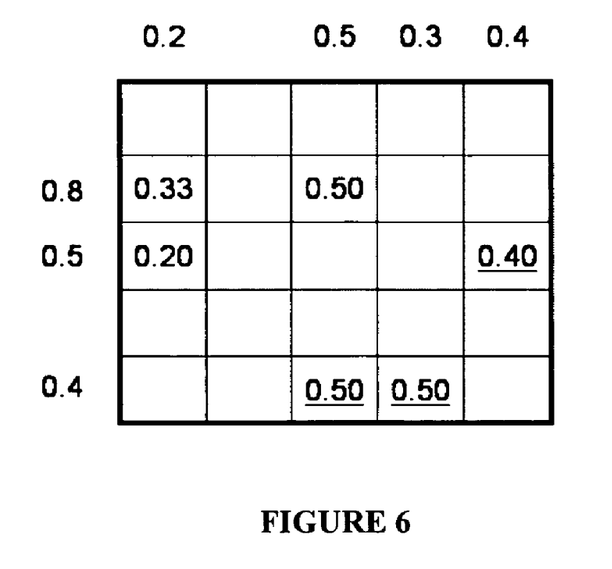
FIG. 6 shows the sample handover matrix with the values marked for removal in FIG. 5 removed.

The underlined values in FIG. 5 are removed. All values in a row whose row label is underlined are removed. All values in a column whose column label is underlined are removed. The result of these removal operations are shown in FIG. 6. The result is 6 remaining values. The remaining values are inspected and marked for removal if the difference of the row label and the column label is less than or equal to the hysteresis margin.

Next, consider application of the hysteresis margin to FIG. 6. The hysteresis margin is set to 0.2 in accordance with the earlier assumption. Only values whose row label exceeds its column label by more than 0.2 are allowed to remain. Three entries are identified whose row label is within 0.2 of its column label. Consider, for example the entry in the third row and the fifth column. The third row is labeled 0.5 and the fifth column is labeled 0.4. Since 0.5-0.4=0.1 and 0.1 is less than or equal to 0.2 the entry is marked for removal. Two other entries, labeled 0.5 in the fifth row, are underlined as being marked for removal via similar logic.

Figure 7:
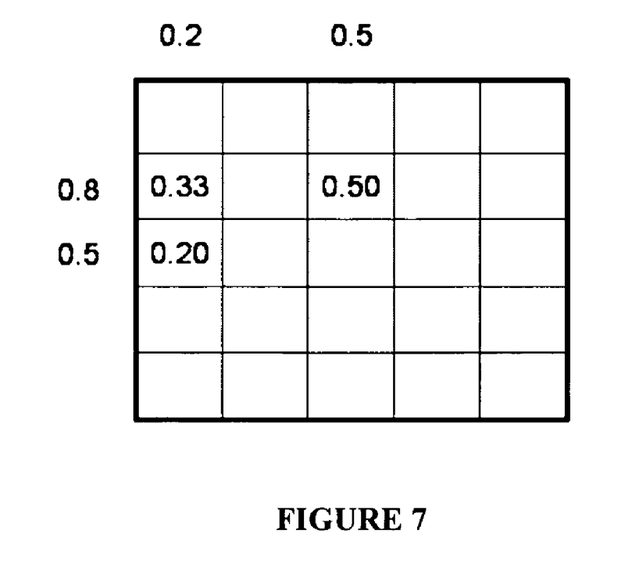
FIG. 7 shows the sample handover matrix with the values marked for removal in FIG. 6 removed.

FIG. 7 shows the matrix of FIG. 6 with the entries marked for removal removed. The result is 3 remaining values. Columns that have entries represent sectors that should increase their overhead power. Rows that have entries represent sectors that should decrease their overhead power. In case of a tie (both increase and decrease indications) the sector should increase its overhead power.

The sectors which should increase their overhead power and those which should decrease their overhead power can now be read directly from FIG. 7. Identify columns which have non-zero entries. These columns represent sectors whose overhead power should be increased. In FIG. 7, columns 1 and 3 have non-zero entries, therefore sectors 1 and 3 should increase their overhead power. Next identify rows which have non-zero entries. These rows represent sectors whose overhead power should be decreased if and only if they have not been marked for increase via the previous column inspection operation. In FIG. 7, rows 2 and 3 have non-zero entries. Sectors 2 and 3 are candidates for a decrease in overhead power. Sector 3 has already been marked for an increase in overhead power so it is removed from this list. Only Sector 2 will decrease its overhead power.

In summary, Sector 2 decreases its overhead power and both Sectors 1 and 3 increase their overhead powers. MOAF has reduced the size of a sector whose load was 0.8 and has increased the size of two sectors to accept this load whose loads were 0.2 and 0.5. The exact amount of load that is transferred is unknown but is assessed via the simulation model as described previously in FIG. 2.

While there has been described and illustrated a method and algorithm for adjusting loading and overhead power allocation to assign cells in a cellular system, it will be apparent to those skilled in the art that variations and modifications are possible without deviating from the broad principles and teachings of the present invention which shall be limited solely by the scope of the claims appended hereto.

What is claimed is:

1. A method of optimizing cell site capacity using electrical modifications in a Modified Overhead Adjustment Function optimizer comprising the steps of:
   (a) verifying a load of a sector i exceeds a decrement threshold, load(i)>t_dec;
   (b) verifying a fractional overhead of sector i exceeds a minimum allowed fraction f_OH(i)>f_min(i);

(c) for each sector i meeting steps (a) and (b) find a sector j that is known to support soft handover with sector i for which the probability of there being a soft handover pair exceeds a threshold T;
   (d) for each sector j meeting the requirements of step (c), verifying the load of sector j meets or falls below an increment threshold, load(j)≦t_inc;
   (e) for each sector j meeting the requirements of step (d), verifying the fraction overhead of sector j is less than a maximum allowed fraction, f_OH(j)<f_max(j);

(f) for each sector j meeting the requirements of step (e), verifying the load of sector j is smaller than the load of sector i by at least a hysteresis margin h as load(j)<load(i)−h;
   (g) for each sector j meeting the requirements of step (f), setting a decrement flag for sector i and an increment flag for sector j as flag_dec(i)=1 and flag_inc(j)=1;

(h) for those sectors i for which flag_inc(i)=1, increasing an overhead power by delta_OH; and
   (i) for those sectors i for which flag_inc(i)=0, and flag_dec(i)=1, decreasing an overhead power by delta_OH.

2. A non-transitory program storage device, readable by machine, tangibly embodying a program of instructions executable by the machine to cause the machine to perform a method for optimizing cell site capacity using electrical modifications comprising the steps of:
   (a) verifying a load of a sector i exceeds a decrement threshold, load(i)>t_dec;
   (b) verifying a fractional overhead of sector i exceeds a minimum allowed fraction f_OH(i)>f_min(i);

(c) for each sector i meeting steps (a) and (b) find a sector j that is known to support soft handover with sector i for which the probability of there being a soft handover pair exceeds a threshold T;
   (d) for each sector j meeting the requirements of step (c), verifying the load of sector j meets or falls below an increment threshold, load(j)≦t_inc;
   (e) for each sector j meeting the requirements of step (d), verifying the fraction overhead of sector j is less than a maximum allowed fraction, f_OH(j)<f_max(j);

(f) for each sector j meeting the requirements of step (e), verifying the load of sector j is smaller than the load of sector i by at least a hysteresis margin h as load(j)<load(i)−h;
   (g) for each sector j meeting the requirements of step (f), setting a decrement flag for sector i and an increment flag for sector j as flag_dec(i)=1 and flag_inc(j)=1;

(h) for those sectors i for which flag_inc(i)=1, increasing an overhead power by delta_OH; and
   (i) for those sectors i for which flag_inc(i)=0, and flag_dec(i)=1, decreasing an overhead power by delta_OH.

* * * * *

UNITED STATES PATENT AND TRADEMARK OFFICE
CERTIFICATE OF CORRECTION

| | | |
|---|---|---|
| PATENT NO. | : 7,920,867 B2 | Page 1 of 1 |
| APPLICATION NO. | : 11/342100 | |
| DATED | : April 5, 2011 | |
| INVENTOR(S) | : Pollini et al. | |

It is certified that error appears in the above-identified patent and that said Letters Patent is hereby corrected as shown below:

In The Specification

In Column 2, Line 58, delete "decreased. as" and insert -- decreased as --, therefor.

In Column 5, Line 21, delete "step 4." and insert -- step 4: --, therefor.

In Column 8, Line 32, delete "as its values exceeds" and insert -- as its value exceeds --, therefor.

In The Claims

In Column 9, Line 27, in Claim 1, delete "load(i)>t dec;" and insert -- load(i)>t_dec; --, therefor.

Signed and Sealed this
Twenty-seventh Day of January, 2015

Michelle K. Lee
*Deputy Director of the United States Patent and Trademark Office*